Aug. 17, 1954  B. MARDER  2,686,583
PHONOGRAPH RECORD VENDING MACHINE
Filed Oct. 25, 1949  4 Sheets-Sheet 2

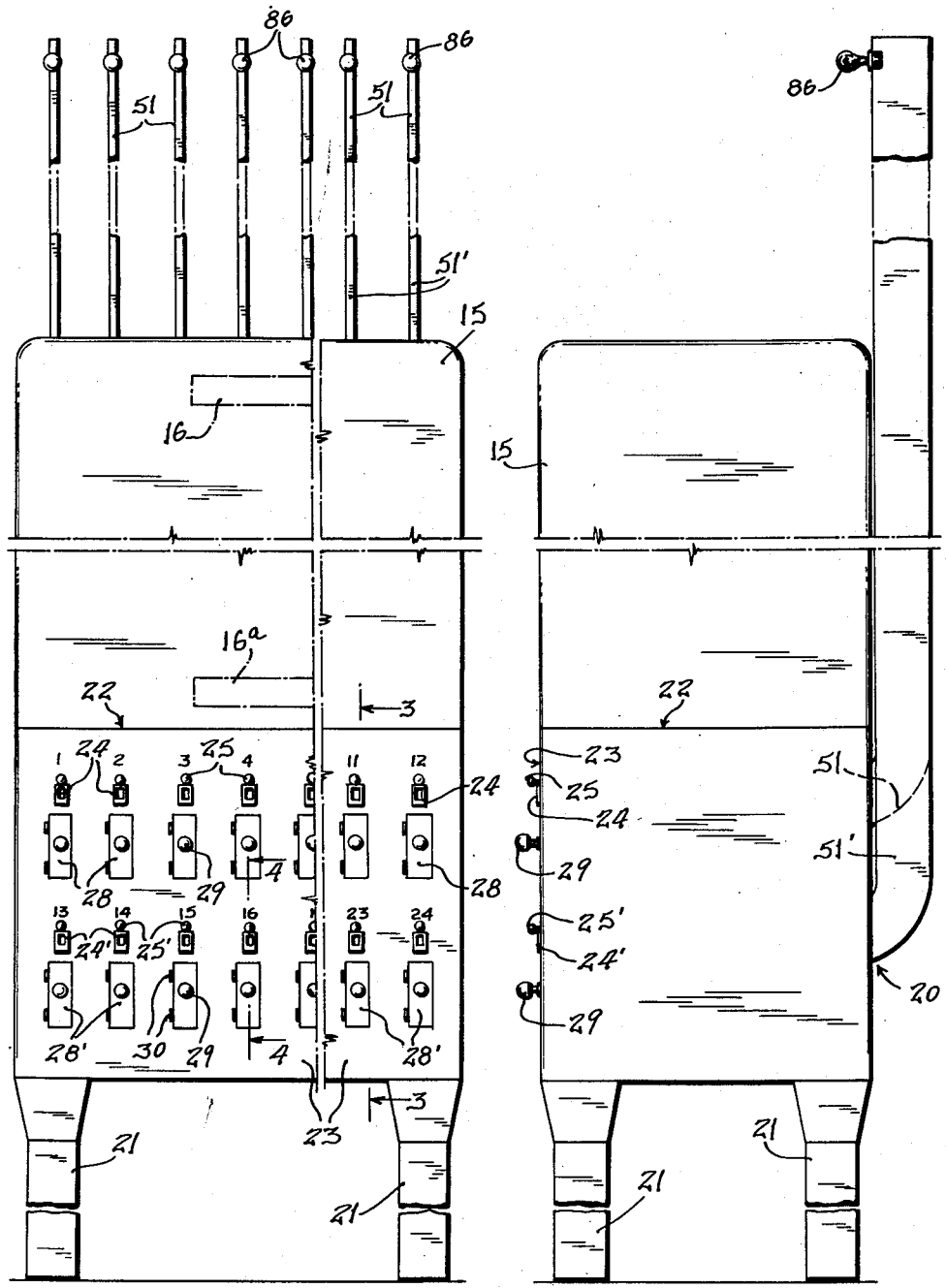

INVENTOR.
BERNARD MARDER
BY
ATTORNEY

Aug. 17, 1954 B. MARDER 2,686,583
PHONOGRAPH RECORD VENDING MACHINE
Filed Oct. 25, 1949 4 Sheets-Sheet 3

INVENTOR.
BERNARD MARDER
BY
ATTORNEY

Aug. 17, 1954

B. MARDER 2,686,583

PHONOGRAPH RECORD VENDING MACHINE

Filed Oct. 25, 1949

INVENTOR.
BERNARD MARDER
BY
ATTORNEY

Patented Aug. 17, 1954

2,686,583

UNITED STATES PATENT OFFICE 2,686,583

PHONOGRAPH RECORD VENDING MACHINE

Bernard Marder, Far Rockaway, N. Y.

Application October 25, 1949, Serial No. 123,461

3 Claims. (Cl. 194—74)

This invention relates to new and useful improvements in automatic vending machines; and more particularly, the aim is to provide a novel and valuable such machine, which may be, and desirably is, a part of a general structure inclusive of a so-called juke box, and which incorporates a plurality of storage compartments, each for duplicates of a different phonograph record, in combination with coin operated mechanisms, one associated with each of said compartments and operable following deposit of a coin in an appropriate slot to effect operation of said mechanism to deliver to the patron depositing said coin one phonograph record of the selected kind.

Thus, a patron of an establishment where there are installed one or more juke boxes, each for example containing 24 phonograph records any selected one of which will be played following deposit of a coin, and who, on hearing played one of said records, takes such liking thereto as to desire then and there to acquire a corresponding record for home use, may then and there purchase a duplicate of said record by use of the apparatus herein proposed.

The new vending machine of the present invention may incorporate, as the same is herein shown, such novel and valuable provisions, as one to prevent an unscrupulous patron from obtaining more records than he has paid for; another for preventing the deposit by him of a coin in the slot selected when in the supply compartment after delivering an appropriate record there is inadvertently an inadequate quantity of such records to insure perfect dispensing of one thereof; another for signaling to an attendant when any such supply compartment is reduced to said inadequate quantity of its records; and another for notifying the attendant which is the particular supply compartment which now has said inadequate quantity of its records.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 front elevationally shows in general outline a conventional type of juke box, and, in combination therewith, a now favored embodiment of the present invention forming a part of a general structure of which the juke box is also a part.

Fig. 2 shows said structure in side elevation.

Figure 4:
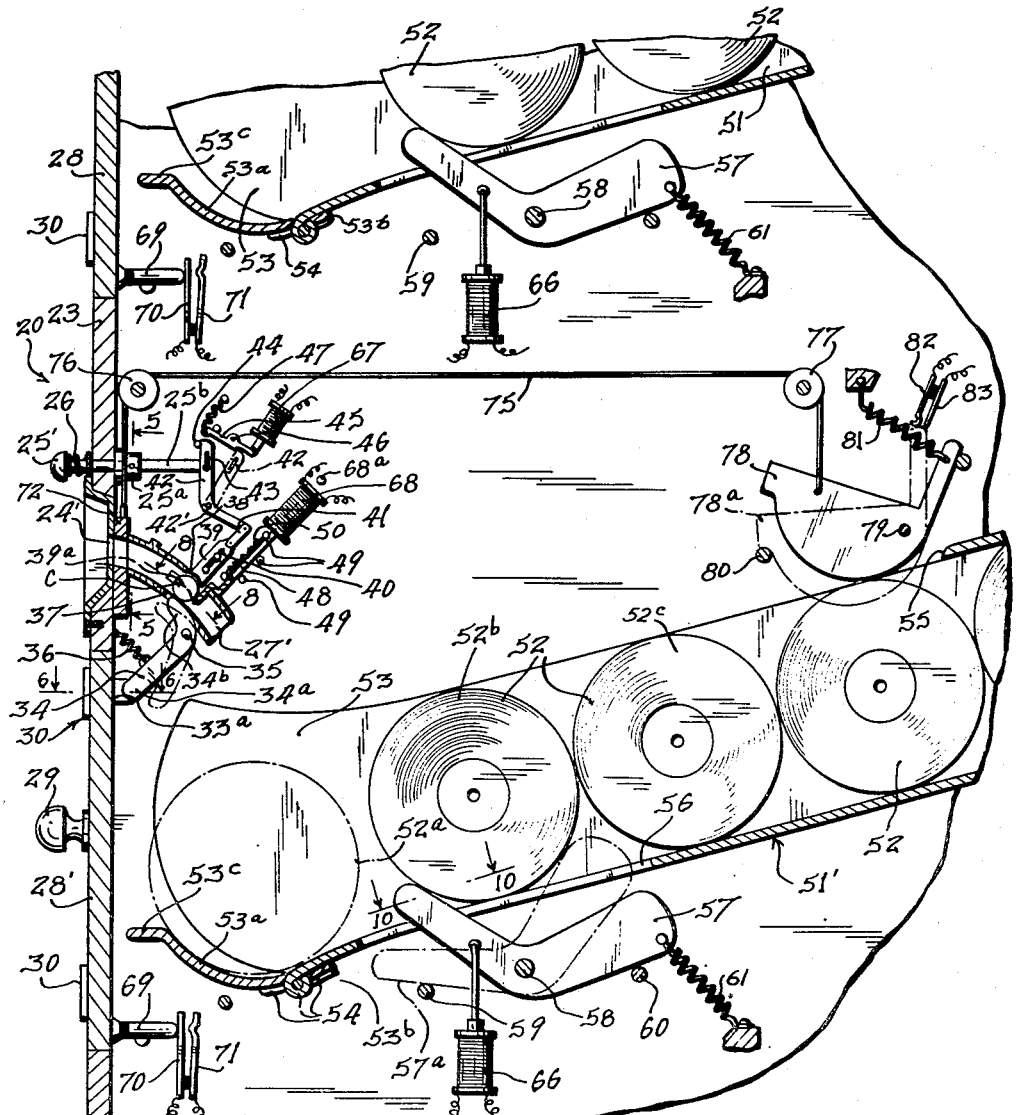
Fig. 4 is a further enlarged detail view, this being a vertical section taken on the line 4—4 of Fig. 1 for more clearly showing certain of the parts appearing in Fig. 3.
Figure 5:
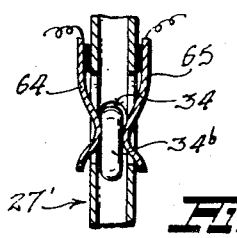

Fig. 5, drawn to a scale enlarged over that of Fig. 4, is a horizontal section taken on the line 5—5 of Fig. 4.

Figure 6:
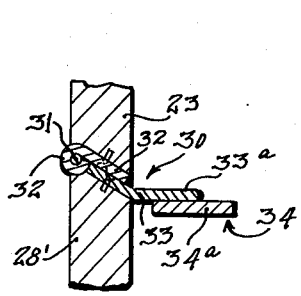

Fig. 6, also an enlarged view, is a vertical section taken on the line 6—6 of Fig. 4.

Figure 7:
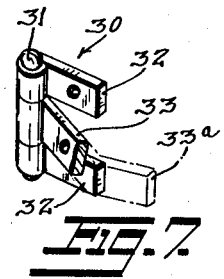

Fig. 7 is a perspective view of a special hinge structure as shown cross-sectionally in Fig. 6.

Figure 8:
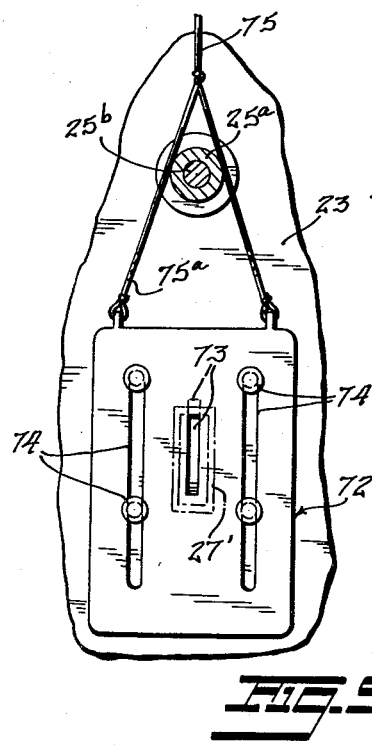

Fig. 8 is an enlarged fragmentary detail section, taken on the line 8—8 of Fig. 4, showing, particularly, a pair of contacts carried at opposite sides of a coin chute.

Figure 9:
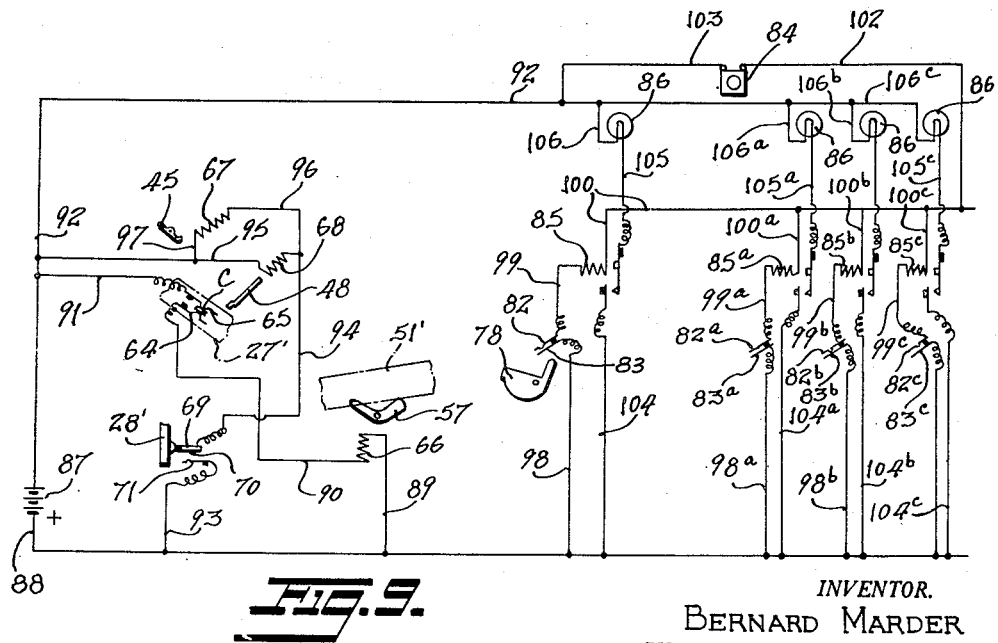

Fig. 9 is mainly a diagrammatic view, illustrating certain electrical connections and devices some individual to the dispensing means associated with one record supply compartment and others common to all such dispensing means.

Figure 10:
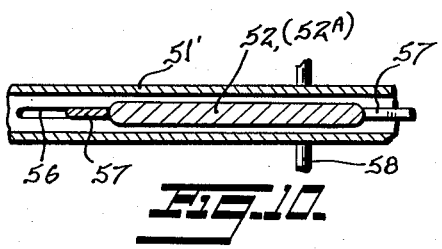

Fig. 10 is a fragmentary detail section, taken on the line 10—10 of Fig. 4.

Referring now to the drawings more in detail, with main reference first to Figs. 1 and 2, a juke box is schematically indicated at 15. At 16 is indicated its panel for presenting a line of coin receiving slots into any one of which a coin is to be deposited pursuant to a patron's desire to hear played a particular one of a number of different music or sound records, said panel 16 being shown in accordance with a location therefor in some instances adopted. The bottom of such a juke box is generally supported on fairly short legs, thereby to bring the panel 16 within convenient hand reach of a patron. In the present case, however, said panel would more conveniently be located as indicated at 16ª, so that, with the bottom of box 15 at a higher level than usual, for a reason which will appear in a moment, said panel will be in convenient reach.

The illustrative embodiment of the present invention herein shown is illustrated as forming part of a general structure of which the juke box also forms a part; although it is to be understood that the present invention may be embodied as an apparatus separate from, and spaced at any suitable distance from the juke box. The juke box adjunct thus illustrated as provided by the present invention is as a whole marked 20.

This adjunct, or box, as it will from now on be called, may rest directly on four legs 21, above said legs, there being a main box 22 having a pair of side walls and other suitable walls including a front wall 23.

Said front wall 23 is provided with two lines of coin slots 24 and 24', one for each of all the different kinds of records to be dispensed; such total being indicated, as will be noted in Fig. 1, as 24 in number.

Adjacent to each of said slots is a push-button 25 or 25' for actuation in connection with the deposit of a coin in the related coin slot. Each of said push-buttons is at the outer end of a stem around which is an expansile coil spring 26 for normally urging the push-button to extreme outward position. Said stems pass through suitable openings in the front wall 23, and beyond said wall each stem is provided with a collar 25$^a$ to limit outward movement of the push-button. Said stem designated 25$^b$, extends somewhat inward of the main box 22.

Opposite the inner end of each coin slot is a coin receiving chute 27 or 27', suitably fixedly supported. Also across said wall 23 are 24 like hingedly mounted doors 28 or 28', each having a suitable pull knob 29.

The upper hinge mounting for each door includes a special hinge 30 having a pintle 31. This hinge (Fig. 7) also includes two spaced leaves 32, secured in the door opening, and a central main leaf 33. Extended from the main leaf 33 there is a keeper portion 33$^a$ for functioning, when the door is closed, relative to bolt portions 34$^a$ to lock the door against being illicitly opened.

Figure 3:
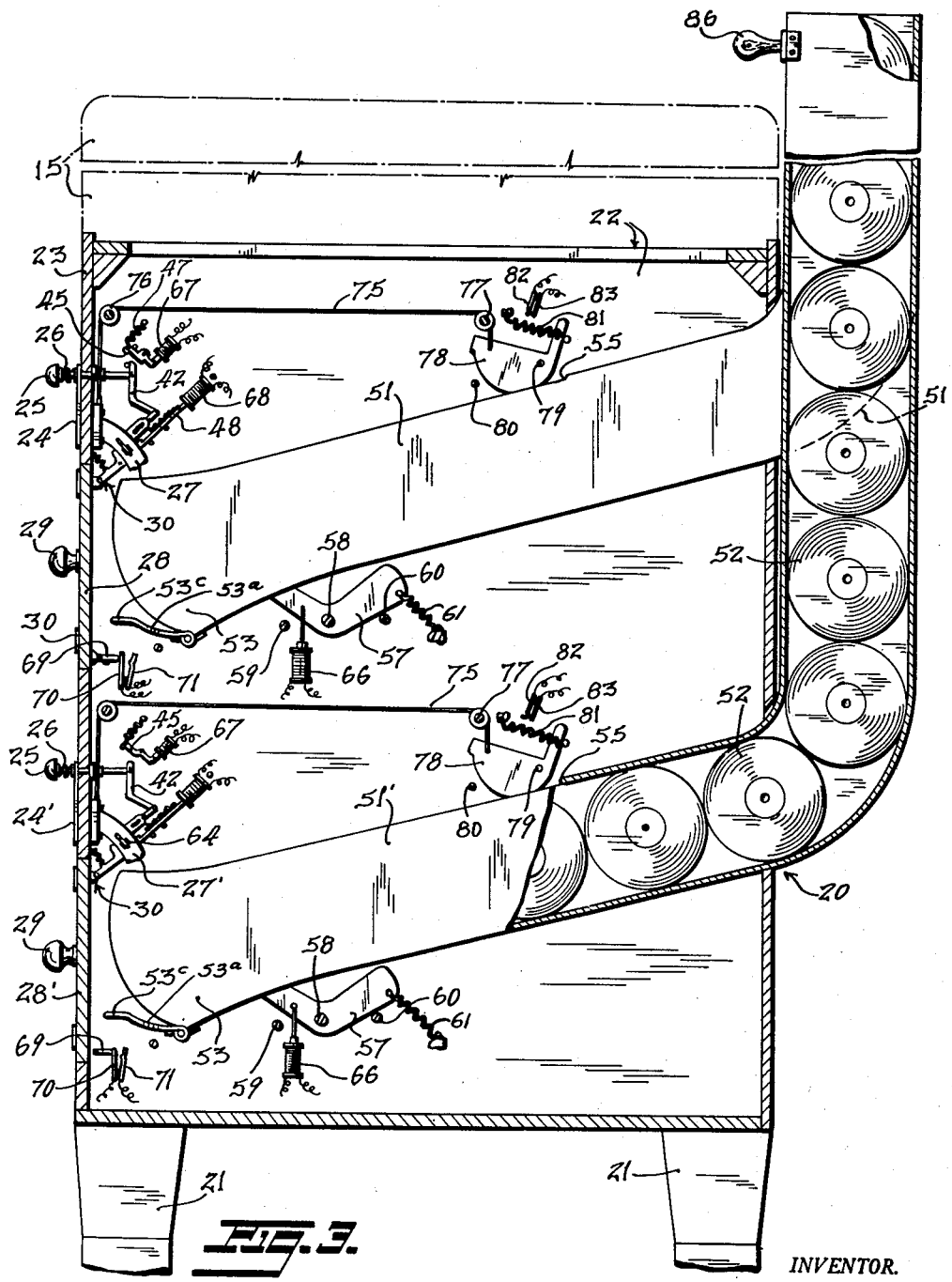
Fig. 3 is an enlarged fragmentary detail view, this being a vertical section taken approximately on the line 3—3 of Fig. 1.

From now on Fig. 3, and particularly Fig. 4, will primarily be referred to, in connection with a typical combination of means (one combination of these means is provided relative to each coin chute 27 and 27'), as associated with the chute 27' seen in Fig. 4.

The bolt portion 34$^a$, for engagement with the keeper portion 33$^a$, is the downward extension of the lower end of a door-lock lever 34 pivoted on a pin 35 and urged by a spring 36 to its normal position, shown by the full lines in Fig. 4. For allowing swing of the upper arm 34$^b$ of the lever 34, the coin chute 27' has a slot 37 along its bottom.

The top of the coin chute 27', at a point above the upper arm 34$^b$, has a longitudinally extending slot 38, for permitting up and down movement of a slide bar 39 having a concavely curved lower end shaped in conformity with the radius of a coin to be inserted in the chute and to be adjacently arrested as will be explained in a moment. The slide bar 39 has a suitable pin-and-slot guiding means 40. A link 41 is pivotally connected with said bar 39 and with the lever next-mentioned.

Above the slot 38 along the top of the chute 27', there is another lever 42, pivoted at 42', and coupled by a pin-and-slot connection 43 to the inner end of the stem 25$^b$ of the associated push button 25'. A stop for lever 42 is indicated at 44. To lock the button 25' temporarily in its pushed-in position, there is a latch-arm 45 pivoted at 46 which is served by a suitable stop and urged by a spring 47 to its disposition shown in Fig. 4, to be in position to engage the lever 42 and lock the push button 25' in a pushed-in position.

Intersecting the inner end of said slot 38, the chute 27' has a transverse slot as shown for allowing up and down movement of a slide-gate 48 guided by spaced fixed horizontal rods 49 and urged to lowermost position by a spring 50 stretched between one of said bars and a lug on the armature of the solenoid illustrated, thereby blocking further descent along the chute 27' of the deposited coin, which latter is indicated as thus arrested at C.

It has been noted that the push buttons are arranged in two lines or tiers 25 and 25' at the front of the box 22, as are also the coin slots 24 and 24', the coin chutes 27 and 27', and the doors 28 and 28'. This is for the purpose of giving a wide selection of different records to be dispensed, without making the box 22 of undesirable width.

In conformity with this arrangement, the delivery ends of the aforesaid record supply compartments are also arranged in two tiers, one above the other. These compartments, it will be noted, are themselves chutes, of which those in what will be called the upper tier are designated 51 and those in what will be called the lower tier are designated 51'.

Said chutes, which interiorly thereof are of a width very slightly more than the thickness of a record (see Fig. 10), are all alike in that each includes a forward lower subdivision obliquely downwardly forwardly inclined and a rear subdivision having upwardly a vertical direction of extension to an extent such that the top of the last named subdivision may be as much higher as desired than the top of the juke box 15.

These chutes 51 and 51', with their tops all at the same level, are there open for the easy placement therein of columns of records so consecutively placed that by its own weight any record in a chute will roll down along the same toward a point at the lower forward end of the chute adjacent to the appropriate door 28 or 28'.

Such a column of records is shown at 52, with the record in position to be delivered to a patron being indicated at 52$^a$ in dot and dash lines in Fig. 4, with the record next behind the record 52$^a$ being marked 52$^b$, and with the record therebehind being marked 52$^c$. The record 52$^a$, it will be observed, is in a take-out receptor 53 constituting the forward end of its chute. Said receptor has a hingedly mounted bottom wall 53$^a$, projected rearwardly beyond its hinge mounting to include a stop-leaf portion 53$^b$, and shaped at its forward end to present a manually depressible finger-piece lip 53$^c$, a torsion spring 54 being provided for normally holding the parts as shown in Fig. 4.

Along the bottom of each record holding chute, as shown in the case of the last-named chute 51', there is a slot 56 (again see Fig. 10) narrower than the thickness of a record. Below said slot a record escapement lever 57 is pivoted at 58, is served by stops 59 and 59, and is normally urged against the stop 60, to the full to line position shown in Fig. 4 by a retractile spring 61.

The coin chute 27', at the exterior of each of its side walls carries one of a pair of contacts 64 and 65, see particularly Fig. 8. These contacts are for being bridged by the inserted coin when it reaches the aforesaid location at which the coin C is shown, which coin is there arrested by the slide-gate 48; and to permit the coin thus to function, said side walls of said chute 27' are suitably apertured (see Fig. 8) and the free ends of said contacts are suitably crimped to project into the interior of said chute yet so as not to touch each other.

For lifting the gate 48, a solenoid 68 is provided, with its armature, connected to said gate and served by a stop 68$^a$, so arranged that when the solenoid is energized the gate will be lifted to free the coin to drop along the chute beyond the gate for delivery to a suitable coin collecting receptacle not shown.

A solenoid 67 is provided and operably associated as shown with the latch arm 45 whereby when this solenoid is energized said arm 45 will be unlatched from the lever 42 and the push button 25' will return to normal position.

In order to pivot the record escapement lever 57 from its full line to its dot and dash line position 57ª in Fig. 4, a solenoid 66 is provided, which solenoid is operatively associated with said lever as shown. On energization of this solenoid, the lever 57, which first insures an arresting of the record 52ᵇ is pivoted freeing the record 52ᵇ to drop rollingly into the take out receptor 53 and so to become disposed as at 52ª.

On the back of each door, as shown in the case of the door 28' of the parts now being described, there is post or pin 69. Pin 69 touches contact 70 when door 28' is closed. Contact 70 is normally slightly spaced from contact 71. When the door 28' is automatically slammed closed after a patron has removed a record and released knob 29, the pin 69 strikes contact 70 throwing it forward to touch momentarily the contact 71. This closing may be effected in any suitable way, as by constituting the lower one of the door's hinges a spring hinge.

At the inner side of the front wall 23, opposite the upper end of the coin chute 27', is a slide-block 72 having a coin passing slot 73 and guided for vertical up and down movement by such a pin-and-slot means as indicated at 74, in Fig. 5. When said block 72 is in its normal position, that is, its lowermost one, the slot 73 is in line with the slot 24' and with the upper end of the coin chute 27'. When, however, said block 72 is raised to the limit of its upward movement, it blocks the inner end of the said slot 24'.

In order predeterminedly to bring said slide to its last named position, a mechanism is provided which includes a pair of upwardly converging cable members 75ª connected at their lower ends to the top of the block 72, and thence, continued as a single cable 75 passing over a pair of idler rollers 76 and 77. Beyond the roller 77, the cable 75 is connected to an extension from a uniplanar rocker-plate 78 pivoted at 79 and above the open top of the record supply chute 51' forward of the point 55, there being a stop 80 for limiting swing of said arm 78 in one direction and a spring 81 for urging said arm to swing toward the stop.

When there are three or more records 52 in the chute 51', the third record behind the forward arm of the lever 57, that is, a record just behind the record 52ᶜ, will be below the rocker-plate 78 and then said arm will be in its full line position and hence the plate 72 will not block deposit of a coin. When, however, there are merely two records in the chute 51', said plate 78 will be lowered to its broken line position, thereby and through a pull on the cable 75 to raise said plate 72 to block deposit of a coin.

When the rocker plate 78 is thus lowered, it closes a normally open pair of contacts 82 and 83.

Referring from now on primarily to Fig. 9:

An audible alarm, as an electric bell 84, is placed somewhere on the premises; this operably associated with all the record supply chutes 51 and 51'.

Also operably associated with said contacts 82 and 83 is a relay 85 to be energized when said contacts are closed.

Further, at the top of the record supply chute 51' is an electric light bulb 86.

The portion of Fig. 9 spaced as a group-showing to the right of the relay 85 in Fig. 9, is for schematically indicating the parts individually operably associated with some of the other chutes 51 and 51'; of which parts last referred to, those for various ones of said other chutes, and in each case corresponding to the parts associated with the chute 51' in this view, are marked with the same reference numerals as used relative to the parts associated with said chute 51' but, in the case of different ones of said other chutes, with the suffix a, b, or c added.

*Operation*

On deposit of a coin into a coin chute (as the chute 27' in regard to which special attention has been devoted), said coin is arrested by the slide-gate 48, at the location C shown in Figs. 4 and 9.

On now pushing in the associated push-button 25', the lever 42 is rocked, thereby to force down the slid-bar 39 to bring its lower end to the location 39ª, and thus by way of the now arrested coin to rock the door-lock lever 34 to its broken line position, shown in Fig. 4, and so to unlock the door 28' by clearing away the bolt portion 34ª from the keeper portion 33ª included in the door's upper hinge 30.

Meanwhile, however, the coin has bridged the contacts 64 and 65, and the lowermost record 52 in the record supply chute 51' has been released to become relocated as at 52ª; this resulting from energization of the solenoid 66, with consequent rocking of the escapement lever 57 to its position 57ª. The circuit for such energization may be traced as including a suitable current source indicated at 87, and leads 88, 89, 90, 91 and 92.

With the door 28' opened, the patron may remove the record 52 in the take-off receptor 53 following manual depression of the finger-piece 53ᶜ; and then, when he frees the door for self-closing as above, pin 69 throws contact 70 against contact 71 momentarily, the solenoids 67 and 68 become energized momentarily to raise the slide-gate 48 to release the coin as arrested at C, and to free the latch-arm 45 from the stem 25ᵇ of the push button 25'—this last freeing the spring 36 to swing the lever 34 to relock the door closed. The solenoid 68 is energized via a circuit including the leads 88, 93, 94, 95 and 92; and the solenoid 67 is energized via a circuit including the leads 88, 93, 94, 96, 97 and 92.

Should the contacts 82 and 83 become closed, for the reason already explained, to wit, the lack of a suitable supply of the records 52 in the chute 51', the bulb 86 atop that chute will become lighted (as a result of the energization of the relay 85, by way of a circuit including the leads 88, 98, 99, 100, 102, 103 and 92), consequent upon the then closing of a circuit including the leads 88, 104, 105, 106 and 92. Therefore, as will now be understood, any one of the bulbs 86 will become lighted, according to which one of the record supply chutes 51 and 51' lacks a proper supply of its records.

At the same time, to warn that some one of these chutes needs more records, the bell 84 will ring; this being effected by way of a circuit including the lead 88, the leads 98 and 99 (or, as the case may be, the leads 98ª and 99ª, the leads 98$^b$ and 99$^b$, or the leads 98$^c$ and 99$^c$), and the leads 100, 102, 103 and 92.

It is to be understood that the supply chutes 51 and 51′ may be lined with soft material and that the records 52 may be sold in packaged condition. Additional packaging paper may also be provided in any suitable container attached to the juke box.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an apparatus for dispensing phonograph records having a box including a front wall formed with a discharge opening closed by a door and a coin insertion slot above the opening and a chute for records within the box having a discharge end behind the door, a coin chute mounted on the inner face of the front wall to receive a coin inserted into the coin slot, releasable means including a solenoid for arresting an inserted coin in position in the coin chute, hinges pivotally mounting the door to be manually opened and having leaves secured to the door and leaves secured to the material of the box defining the discharge opening, a keeper portion extended into the box from one of the leaves secured to the door, a door-lock lever pivotally mounted within the box and having at one end a bolt portion for engagement behind said keeper portion retaining the door in a closed position, said coin chute having slots above and below the coin arrested by said means, said lever having its other end aligned with the slot of said coin chute below the coin to be pivoted when the coin is pressed downward to disengage said bolt portion from said keeper portion freeing the door to be opened for removal of a record in the lower end of the record chute, and means extended into the coin chute through the slot in the top of the coin chute for pressing downward on the inserted coin, said coin pressing means comprising, a push button slidably mounted through the front wall, a slidably mounted slide bar having its lower end positioned to enter the coin chute through the slot above the arrested coin, and linkage interposed between said slide bar and said push button for causing said slide bar to enter the coin chute and push downward on the arrested coin when the push button is pressed inward, and a coil spring on said push button and bearing against the front wall of the box for holding the push button in an extended position, and means for holding said push button in a pressed in position in which said slide bar holds the coin pressed downward.

2. In an apparatus for dispensing phonograph records having a box including a front wall formed with a discharge opening closed by a door and a coin insertion slot above the opening and a chute for records within the box having a discharge end behind the door, a coin chute mounted on the inner face of the front wall to receive a coin inserted into the coin slot, releasable means including a solenoid for arresting an inserted coin in position in the coin chute, hinges pivotally mounting the door to be manually opened and having leaves secured to the door and leaves secured to the material of the box defining the discharge opening, a keeper portion extended into the box from one of the leaves secured to the door, a door-lock lever pivotally mounted within the box and having at one end a bolt portion for engagement behind said keeper portion retaining the door in a closed position, said coin chute having slots above and below the coin arrested by said means, said lever having its other end aligned with the slot of said coin chute below the coin to be pivoted when the coin is pressed downward to disengage said bolt portion from said keeper portion freeing the door to be opened for removal of a record in the lower end of the record chute, and means extended into the coin chute through the slot in the top of the coin chute for pressing downward on the inserted coin, said coin pressing means comprising, a push button slidably mounted through the front wall, a slidably mounted slide bar having its lower end positioned to enter the coin chute through the slot above the arrested coin, and linkage interposed between said slide bar and said push button for causing said slide bar to enter the coin chute and push downward on the arrested coin when the push button is pressed inward, and a coil spring on said push button and bearing against the front wall of the box for holding the push button in an extended position, and means for holding said push button in a pressed in position in which said slide bar holds the coin pressed downward, said holding means including a release solenoid, and means for energizing said solenoids to release said holding means to free said push button and to release said releasable means to free the arrested coin to drop from the coin chute.

3. In an apparatus for dispensing phonograph records having a box including a front wall formed with a discharge opening closed by a door and a coin insertion slot above the opening and a chute for records within the box having a discharge end behind the door, a coin chute mounted on the inner face of the front wall to receive a coin inserted into the coin slot, releasable means including a solenoid for arresting an inserted coin in position in the coin chute, hinges pivotally mounting the door to be manually opened and having leaves secured to the door and leaves secured to the material of the box defining the discharge opening, a keeper portion extended into the box from one of the leaves secured to the door, a door-lock lever pivotally mounted within the box and having at one end a bolt portion for engagement behind said keeper portion retaining the door in a closed position, said coin chute having slots above and below the coin arrested by said means, said lever having its other end aligned with the slot of said coin chute below the coin to be pivoted when the coin is pressed downward to disengage said bolt portion from said keeper portion freeing the door to be opened for removal of a record in the lower end of the record chute, and means extended into the coin chute through the slot in the top of the coin chute for pressing downward on the inserted coin, said coin pressing means comprising, a push button slidably mounted through the front wall, a slidably mounted slide bar having its lower end positioned to enter the coin chute through the slot above the arrested coin, and linkage interposed between said slide bar and said push button for causing said slide bar to enter the coin chute and push downward on the arrested coin when the push button is pressed inward, and a coil spring on said push button and bearing against the front wall of the box for holding the push button in an extended position, and means for holding said push button in a pressed in position in which said slide bar holds the coin pressed downward, said holding means including a release solenoid, and means for energizing said solenoids to release said holding means to free said push button and to release said releasable means to free the arrested coin to drop from the coin chute, said holding means being resiliently retained in an operative position for holding said push button in a pushed in position.

References Cited in the file of this patent

UNITED STATES PATENTS

| Number | Name | Date |
|---|---|---|
| 1,134,509 | Boling | Apr. 6, 1915 |
| 1,266,998 | Schenkel | May 21, 1918 |
| 1,519,159 | Neckerman | Dec. 16, 1924 |
| 1,604,804 | Butterfield | Oct. 26, 1926 |
| 1,847,984 | Ruff | Mar. 1, 1932 |
| 2,371,845 | Robison | Mar. 20, 1945 |